United States Patent

[11] 3,601,515

[72] Inventor Winton J. Pelizzoni
      Hagerstown, Md.
[21] Appl. No. 845,993
[22] Filed July 30, 1969
[45] Patented Aug. 24, 1971
[73] Assignee Mack Trucks, Inc.
      Allentown, Pa.

[54] LUBRICANT PUMP
11 Claims, 5 Drawing Figs.

[52] U.S. Cl. .................................................. 418/206,
      74/467, 184/6 U, 184/6 Y
[51] Int. Cl. ..................................................... F01c 1/18
[50] Field of Search ........................................... 418/206;
      103/126 D, 126 LB, 126 H, 126 IO; 184/6 U, 6 Y;
      74/467

[56] References Cited
UNITED STATES PATENTS

| | | | | |
|---|---|---|---|---|
| 1,083,329 | 1/1914 | Lancia | | 103/126 D |
| 1,970,385 | 8/1934 | Maybach | | 184/6 U |
| 2,303,829 | 12/1942 | Dodge | | 74/688 |
| 2,910,142 | 10/1959 | Almen | | 74/467 |
| 3,427,985 | 2/1969 | Difford | | 103/126 L |

*Primary Examiner*—C. J. Husar
*Attorney*—Brumbaugh, Graves, Donohue & Raymond

ABSTRACT: A lubricant pump especially suitable for automotive transmissions and the like employing mating gears, at least one of which extends into a sump in a lower casing area. A channel-defining adapter receives the teeth of two mating gears as they converge toward the area of gear engagement. The adapter and that part of its channel receiving the teeth of at least one gear extend below the lubricant level in the sump to substantially close the spaces between adjacent gear teeth, thus defining compartments within which lubricant is transported toward the location at which the gears converge. By virtue of the increased pressure at the convergence of the gear teeth, the transported lubricant is pumped through an outlet passage in the adapter adjacent the area of gear engagement for remote lubrication of other components. One or both of the mating gears may extend into the lubricant of the sump.

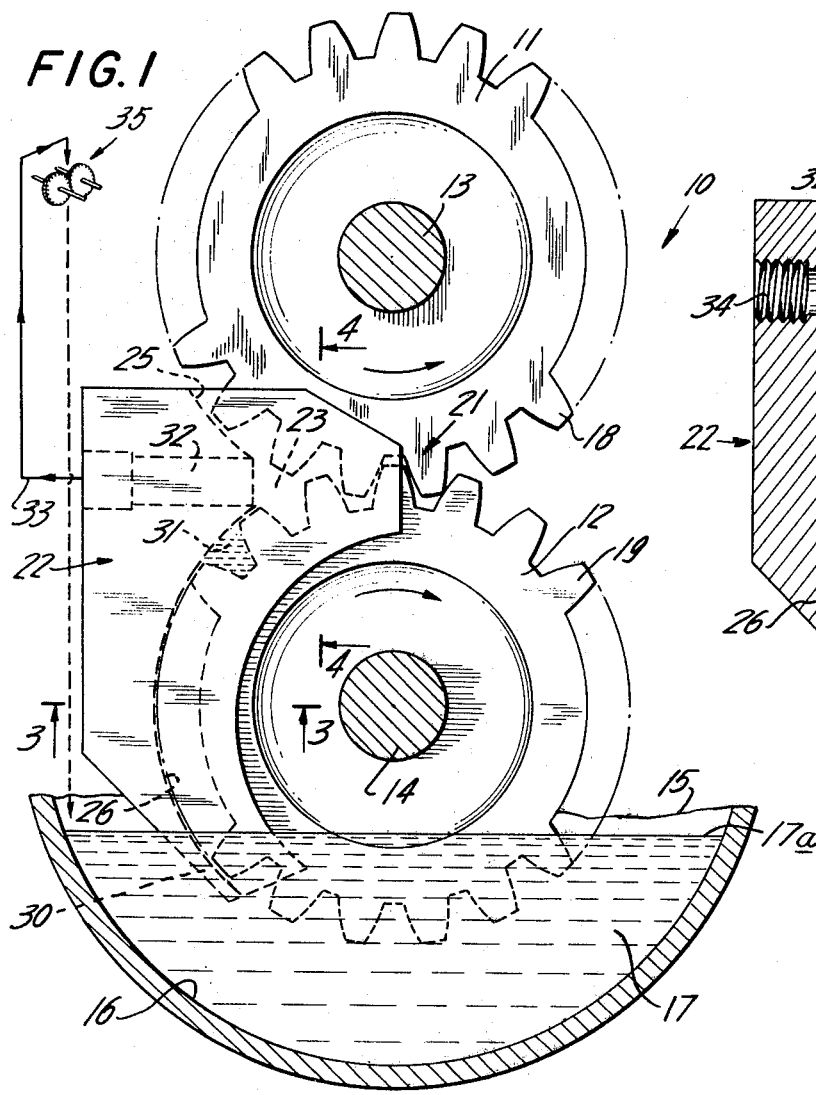
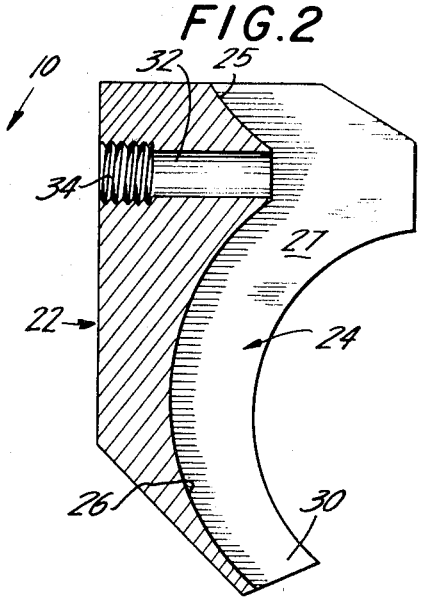
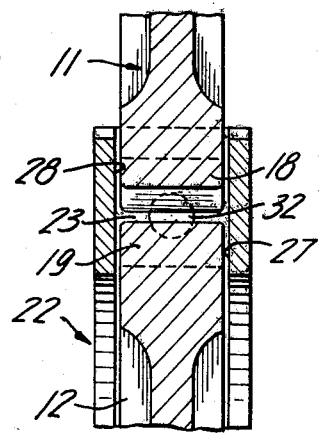
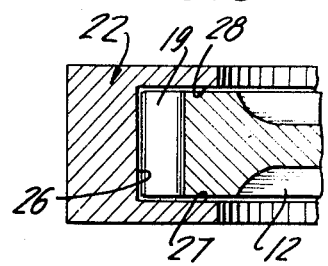

INVENTOR.
WINTON J. PELIZZONI

3,601,515

LUBRICANT PUMP

BACKGROUND OF THE INVENTION

This invention relates generally to lubricant pumps and more particularly to pumps employing the increase in pressure proximate the convergence of gear teeth of a power-transmitting drive train such as an automotive transmission.

It has long been recognized that pressure differentials are created at the points of convergence and divergence of the teeth of mating gears. The continual meshing of converging teeth, for example, is known to produce a continual displacement of air from the spaces defined between adjacent teeth.

Prior art relating to motor vehicles suggests the operation of accessories, such as horns, or "vacuum-operated" windshield wipers, by the employment of air pressure differentials created near the area of engagement of transmission gears. These suggested arrangements characteristically have employed provisions for enclosing, insofar as possible, spaces immediately adjacent the area of engagement of the mating gears to isolate the increased pressure or partial vacuum to be employed. The pressure differentials produced by mating transmission gears have not, however, been employed to pump lubricant from the transmission sump for lubrication of components remote from both the gears and the sump. Indeed, one proposed arrangement for evacuating a transmission casing included special provisions for the removal of small quantities of oil which were unavoidably drawn into an air conduit from the mating gears.

Additionally, the prior art relating to fluid pumping, per se, teaches the employment of the foregoing principle for the production of relatively high-pressure pumps. In such arrangements, two mating gears, forming no part of a power-transmitting drive train, are employed to move liquid into the area of convergence of the gear teeth. For example, the two gears may be enclosed within a relatively close-fitting pump housing into which fluid is drawn near the diverging side of the area of gear engagement. The fluid is then transported by rotation of the two gears to the converging side for emission under relatively high pressure. Here again, the gears of a power-transmitting drive train have not been employed to convey lubricant from a sump for the purpose of remote lubrication.

Thus, the lubrication of transmission components or other drive train components commonly continues to be either by "splash," or by separate and additional oil pumps driven from one of the rotating components. The former method fails to provide controlled lubricant flow to many components requiring lubrication, whereas the latter method requires the expense of providing an entire pump in addition to the drive train.

SUMMARY OF THE INVENTION

In view of the foregoing, it is an object of this invention to provide an improved and inexpensive lubricant-pumping arrangement employing the power-transmitting gears of an automotive transmission or other drive train. Another object of this invention is to provide a lubricant pump in which one or both of a pair of mating, power-transmitting gears of a drive train are at least partly submerged in the lubricant of a sump and in which the lubricant from the sump is expelled from the area of convergence of the mating gears for the lubrication of components remote from both the gears and the sump.

An additional object of this invention is to provide a means for conveying lubricant upwardly, from a lubricant reservoir, toward a gear engagement area above the lubricant level to allow pumping of the lubricant away from such area for the purpose of remote lubrication.

These and other objects of the invention are achieved by the employment of a member or adapter having a channel receiving the converging teeth of mating gears, at least a part of the adapter extending below the lubricant level in close cooperation with the rotating teeth of one or both gears. Lubricant is entrapped between adjacent gear teeth for transfer into the area of convergence of the gears, and an outlet passage opening into the area of convergence conducts fluid away from the gears for controlled flow to remote locations.

This invention will more clearly be understood with respect to the following detailed description and the several figures of the associated drawings.

IN THE DRAWINGS

FIG. 1 is a partially diagrammatic illustration of a lubricant pump formed in accordance with the invention and shows an adapter in cooperation with two rotatable gears, the adapter extending into the sump area of a transmission housing for the transportation of lubricant therefrom upwardly.

FIG. 2 is a sectional view of the adapter of FIG. 1, and shows more clearly the adapter configuration.

FIG. 3 is a fragmentary sectional view, taken along the line 3—3 of FIG. 1, and more clearly illustrates the close association of the gears and adapter.

FIG. 4 is a further fragmentary sectional view, taken along the line 4—4 of FIG. 1, showing the relationship of the outlet passage, the gear-accommodating channel, and the upper and lower mating gears.

DESCRIPTION OF PREFERRED EMBODIMENTS

Figure 5:
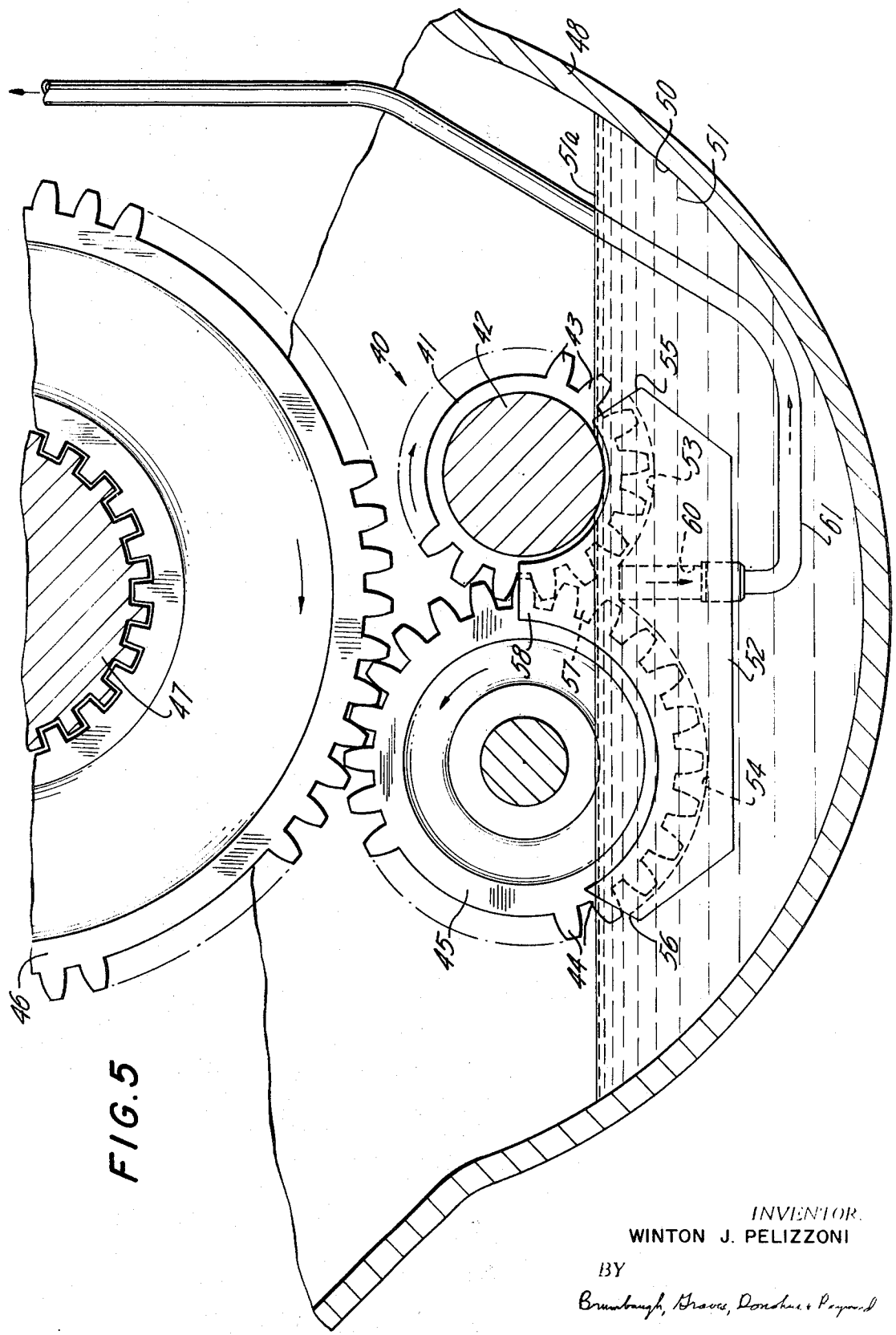
FIG. 5 is a fragmentary sectional view of the lubricant pump of the invention, adapted for use with tow partially submerged mating gears.

Turning now to FIG. 1, there is shown a novel lubricant pump 10 constructed in accordance with the invention. A pair of mating first and second gears 11 and 12, respectively, form a part of a conventional power-transmitting drive train such as an automotive transmission, the upper gear 11 being supported by a shaft 13 and the lower gear 12 being supported by a shaft 14. The upper shaft 13 may conveniently be a normally provided transmission main shaft, and the lower shaft 14 may constitute the usual transmission countershaft and may be the lowermost of a number of gear-supporting countershafts arranged about the main shaft 13, as in the case of multiple-countershaft transmissions.

A casing 15, which includes a sump portion 16, contains a quantity of lubricant 17 for lubrication of the transmission or drive-train components, the quantity of lubricant being such that the lower gear 12 extends below the lubricant level 17a while the gears are rotating and during the operation of the lubricant pump. While only the sump portion 16 of the casing 15 is illustrated, it will be understood that the casing 15 houses the gears 11 and 12, the shafts 13 and 14, and the remaining components of the drive train.

The gear 11 includes a number of peripheral teeth 18 in meshing engagement with a number of peripheral teeth 19 of the gear 12 in conventional fashion, the gears 11 and 12 being rotatable in the direction of the unnumbered arrows shown thereon in FIG. 1 to cause engagement of the teeth in a gear engagement zone generally designated by the numeral 21. The zone of engagement 21 is above the lubricant level 17a, as is normally the case, and absent further elements of the lubricant pump 10, lubrication of the drive-train components remote from the sump area 16 would necessarily require splash lubrication or separate pump arrangements communicating with the lubricant 17.

On the converging side of the area of gear engagement 21, an adapter 22 substantially encloses the relatively high-pressure area 23 of convergence of the gear teeth 18 and 19. A channel 24, formed in the adapter 22, and best illustrated in FIGS. 2 and 3, substantially conforms to the periphery of the gears 11 and 12, having arcuate channel-bottom surface segments 25 and 26 closely proximate the path of travel of the outermost extremities of the gear teeth 18 and 19, respectively. A pair of channel sidewalls 27 and 28 extends closely adjacent opposite sides of the received peripheral portions of the gears 11 and 12 and overlies the area of increased pressure 23 on opposite sides of the gears to enclose the area 23. The channel-bottom surface segments 25 and 26, and channel sidewalls 27 and 28 are preferably machined for minimum clearance with the gear teeth received within the channel 24 to substantially seal both the area of increased pressure 23 and the spaces between adjacent gear teeth received within the channel, restricting the loss of lubricant from within the channel.

The adapter 22, which may be supported in any convenient manner upon one or both of the gear-supporting shafts or upon the casing 15, or which may, if desired, be integrally formed with the casing 15, includes a lower extension 30 through which the channel 24 extends to a location below the level 17a which the lubricant assumes while the gears are rotating and the lubricant pump is in operation. The channel 24, then, forms in cooperation with the teeth 19, of the lower gear 12, a series of lubricant-containing compartments 31 during passage of the teeth 19 toward the area of engagement 21. Thus, lubricant disposed between the teeth 19 is entrapped within the compartments 31 for transportation of the increased pressure area 23 during normal employment of the gears 11 and 12 for power transmission purposes.

An outlet passage 32 communicates with the increased pressure zone 23 and with suitable lubricant-distributing conduits 33, as diagrammatically illustrated in FIG. 1. The outlet passage 32 may be threaded, as illustrated at 34, or may be otherwise conventionally adapted for connection with lubricant distribution tubing or the like to conduct the lubricant away from the adapter 22 for the controlled lubrication of any remote lubricant-requiring components 35. Thus, in the case of automotive transmissions, a controlled lubricant flow is available for the lubrication of remote gears, bearings, bushings, synchronizers, and sliding and multiple disc clutches without reliance upon splash and without the costly addition of driven pump components.

The lubricant pumped away from the gears 11 and 12 and the adapter 22 returns, following lubrication of the remote components, to the sump portion 16 of the casing 15, maintaining the lubricant level 17a for continued lubrication of all selected components. Of course, the level of lubricant in the sump is somewhat lower while the gears are rotating and the lubricant pump is in operation than it is when the gears are at rest and all the lubricant has drained into the sump. Accordingly, the adapter 22 is designed so that its lower extension 30 extends below the lubricant level during rotation of the gears and consequent operation of the lubricant pump, in order to ensure sufficient flow of lubricant to the desired lubricant-requiring components. Thus, it will be seen that the pumping of lubricant is achieved in a convenient fashion in power-transmitting drive trains having a sump, through which rotates only a portion of one of a pair of mating gears.

In FIG. 5, a modification of the lubricant pump according to the invention is shown which employs two mating gears, both of which are at least partially submerged in lubricant. A pump 40 is illustrated which employs the gears of a conventional reverse gear set, commonly employed in automotive transmissions. A driving pinion 41 is supported upon a countershaft 42 and includes teeth 43 in mating engagement with the teeth 44 of a conventional idler pinion 45. A driven gear 46 is slidably supported upon the main or driven shaft 47 of the transmission and may be moved, for example by a conventional shifter fork, into mating engagement with the idler pinion 45.

Again, a casing 48 encloses the gears and includes a sump portion 50 housing a quantity of lubricant 51. A lubricant level 51a is thus defined below which pass the teeth 43 and 44 of the gears 41 and 45 during rotation of those gears.

An adapter 52 encloses a portion of the peripheries of the gears 41 and 45 in arcuate channels 53 and 54, respectively. The channel 53 opens at an adapter end portion 55 below the lubricant level 51a which the lubricant assumes during operation of the transmission. Similarly, the channel 54 opens at an opposite adapter and portion 56 below the lubricant level 51a. Both channels extend in close-fitting relation to the gear teeth 43 and 44 to an increased pressure location 57 proximate the convergence of the gears 41 and 45. Here, the channel sidewalls meet to form an extension 58, substantially enclosing the engaging teeth as they converge.

An outlet passage 60 opens through the adapter 52 into the high-pressure zone 57 for the expulsion of lubricant through the outlet passage. A length of tubing 61 is secured to the adapter 52 in communication with the outlet passage and conducts lubricant away from the mating gears 41 and 45 and away from the sump 51 for the lubrication of remote components.

Lubricant is transported through both of the channels 53 and 54 by the movement of the gear teeth 43 and 44 therethrough. As in the case of the lubricant pump 10 illustrated in FIG. 1, the adapter 52 should be so designed that the end portions 55 and 56 are below the lubricant level 51a during transmission operation. The location at which the gears converge may be above or below the lubricant level 51a. If the lubricant level 51a lies below the zone 57, as shown, the close-fitting relation of the gear teeth 43 and 44 within the channels 53 and 54 provides lubricant transportation upwardly to the zone 57 and outlet passage 60 without substantial loss.

While specific preferred embodiments of the invention have been described in detail, it will be apparent that variations and modifications of the disclosed arrangement may be made without departure from the spirit of the invention.

I claim:

1. A lubricant pump including a casing having a sump for collecting lubricant; a pair of mating rotatable gears, one of which gears has a plurality of teeth adapted for rotation through lubricant in the sump; means defining a channel receiving a number of the teeth of the one gear and extending, in the direction of rotation, from a channel end at a location in the sump below the level of the lubricant in the sump during rotation of the one gear to a location above the lubricant level proximate the engagement of the gears on the converging side thereof; and an outlet passage through the channel-defining means proximate the engagement of the gears for the discharge of lubricant outwardly therethrough.

2. The lubricant pump according to claim 1, wherein the gears engage at a location above the lubricant level, the channel receives teeth on the one gear which are intermediate the lubricant level and the location of gear engagement, and the channel-defining means substantially closes the spaces between received adjacent teeth to restrict loss of lubricant in transit upwardly above the lubricant level toward the gear engagement location.

3. The lubricant pump according to claim 2, wherein the channel-defining means extends below the lubricant level sufficiently to close successively each space between adjacent teeth below the lubricant level, thereby substantially to entrap lubricant within said space for delivery to the outlet passage, the location at which the mating gears diverge being remote from the path along which lubricant is supplied from the sump to the outlet passage.

4. The lubricant pump according to claim 2, wherein the pair of gears comprise at least a portion of a drive train for the transmission of power therethrough, and the outlet passage opens proximate the gear engagement location on the converging side; the pump further comprising means for conducting lubricant from the outlet passage to remote drive-train components.

5. The lubricant pump according to claim 2, wherein the channel receives teeth on the other gear proximate the point of engagement on the converging side thereof, and the channel-defining means includes channel sidewalls and a channel-bottom surface closely proximate the received teeth of both gears to restrict lubricant flow from within the channel other than through the outlet passage.

6. The lubricant pump according to claim 1, wherein the gears include teeth spaced apart about the peripheries of the gears, the channel-defining means includes a channel-bottom surface having two arcuate segments located closely proximate the extremity of the teeth of the two gears, at least one of the arcuate segments extending closely proximate the extremity of an associated gear substantially less than the longer arcuate distance from the convergence location to the location at which the gears diverge, and terminating proximate the periphery of the associated gear and within the sump to form, with the teeth on the associated gear, means for initiating the movement of lubricant from the sump toward said converging side, and the outlet passage opens through the channel-bottom surface where the gears converge to conduct lubricant from within the channel.

7. A lubricant pump including a casing having a sump for collecting lubricant, a pair of mating rotatable power-transmitting gears, at least one of the gears having teeth located for movement within the lubricant of the sump, means defining a channel receiving a number of the teeth of the one gear and extending in the direction of rotation of the one gear from a pump inlet end within the sump to a location proximate the engagement of the gears on the converging side thereof, the channel and the teeth received therein defining means for conveying lubricant from the sump at said pump inlet end to the gear convergence location proximate gear engagement, the gear divergence location proximate the engagement of the gears being remote from the path of movement of pumped lubricant to the gear convergence location, an outlet passage through the channel-defining means proximate the engagement of the gears for the discharge of lubricant outwardly therethrough, and means for directing the discharged lubricant away from the sump and the mating gears for the lubrication of further components.

8. The lubricant pump according to claim 7, wherein the mating gears comprise part of an automotive drive train, said means for directing the discharged lubricant including means for supplying pumped lubricant to associated drive-train components remote from the sump.

9. The lubricant pump according to claim 7, wherein both of said mating gears have teeth located for movement within the lubricant in the sump.

10. The lubricant pump according to claim 9, wherein the location at which said gears mate is below the lubricant level, the outlet passage and the means for directing providing means for conveying lubricant from below the lubricant level to components removed from the lubricant of the sump.

11. The lubricant pump according to claim 9, wherein the channel of said channel-defining means receives teeth on the other gear proximate the point of engagement on the converging side thereof, and the channel-defining means includes channel sidewalls and a channel-bottom surface closely proximate the received teeth of both gears to restrict lubricant flow from within the channel other than through the outlet passage.